Patented Dec. 29, 1953

2,664,357

UNITED STATES PATENT OFFICE 2,664,357

SALT COMPOSITION

Frank G. Miller, Denville, N. J., assignor, by mesne assignments, to Diamond Crystal Salt Co., St. Clair, Mich., a corporation of Michigan No Drawing. Application July 28, 1950, Serial No. 176,517

5 Claims. (Cl. 99—143)

This invention relates to an improved salt composition, and more particularly to such a composition which is both free-flowing and non-caking when exposed to humid conditions for extended periods of time.

In humid weather salt absorbs moisture from the air with the result that it will not flow freely from salt shakers which creates a shaker-salt problem for most domestic purposes. The factor generally contributing to this shaker-salt problem is the tendency of the salt to become damp when exposed to humid conditions, causing a reduction in its flowability and a caking of the salt. When salt is exposed to such humid conditions, moisture is deposited on the surfaces of the salt crystals. This moisture dissolves some of the salt and forms a brine coating over the surface of each crystal. Adjoining crystals of salt become linked together by films of the brine extending from one crystal to another and when such crystals become so linked, the salt lumps and has a reduced flowability. Further, when such crystals have become so linked, a subsequent reduction in the relative humidity of the air causes the brine film to evaporate and the crystals then become bonded together in the form of a cake. Consequently most domestic salt as used for culinary purposes today contains a conditioner or filler for the purpose of increasing the flowability by inhibiting dampening and/or caking tendencies to some degree. In this respect magnesium carbonate, tricalcium phosphate, calcium carbonate and starch have found general use. It has also been proposed to use such materials in combination with an edible water-insoluble soap in order to further improve the characteristics of the salt. Such soaps include the stearates, oleates, palmitates, laurates and like higher fatty acid salts of magnesium, calcium, aluminum, and the like. It has likewise been proposed to use such materials as oatmeal to absorb moisture preferentially. Also, rice is sometimes added to break up any caked salt which may form.

When the common conditioners, such as magnesium carbonate, tricalcium phosphate or calcium carbonate, are used to increase the flowability of the salt by increasing the resistance of the salt to caking and dampening, it has been found inadvisable to use more than 2% of such conditioner due to the fact that when larger amounts are used the salt tends to become dusty and a solution thereof is milky. When water-insoluble soaps are used as conditioners it has been found inadvisable to use more than .05% of the same in order to avoid the formation of a scum on the surface of the water to which the salt composition is added. Combinations of the above conditioners as fillers in the salt seem to also include the same disadvantageous characteristics as would be present with their individual use and such conditioners have therefore generally been added in the amounts of from 1 to 2% of the magnesium carbonate, tricalcium phosphate and/or calcium carbonate and about .05% of the water-insoluble soap though the addition of larger amounts of such conditioners would result in a salt having a more satisfactory flowability and resistance to caking. Thus, none of these conditioners either separately or in combination as used today will as a practical matter maintain the salt in a satisfactory condition for a sufficient length of time in humid weather to eliminate the above-described shaker-salt problem.

The object of this invention is to provide an improved salt composition.

Another object is to provide a salt composition which has a high resistance to the effects of dampening.

Another object is to provide an improved salt composition which will remain free-flowing and resistant to lumping and caking when exposed to humid conditions for extended periods of time.

A still further object is to provide a salt composition which is substantially free from dust and which, when added to water, will give a clear scum-free brine.

Other objects of the invention will be apparent from the following description.

It has now been found that salt compositions to be used for culinary and table use which contain a precipitated magnesium or calcium silicate powder such as are marketed under the trade names "Magnesol" and "Silene" respectively, possess increased resistance to the effects of dampening such as reduced flowability and caking when such compositions are subjected to humid and damp conditions. It has further been found that when an edible water-insoluble soap is added in combination with a precipitated magnesium or calcium silicate, a much greater amount of such insoluble soap can be tolerated in such combinations without causing undesirable scumming in water solutions of such compositions.

In the present invention it has been found that only a certain type of magnesium or calcium silicate when added to regular table salt provides the desired salt compositions. This type is one which is prepared by means of a process which involves the step of precipitation. For example, in the case of precipitated calcium silicate, a water solution of a hydrated silicate such as sodium silicate and a water solution of a soluble calcium salt, such as calcium chloride, are prepared. One solution is poured into the other and a precipitate is formed. The precipitate is calcium silicate which may contain a small amount of sodium chloride occluded therewith. However, most of the sodium chloride formed in the reaction remains in the solution and is separated from the calcium silicate by filtration. The recovered filtrate of calcium silicate is then dried to the desired moisture content. In the case of magnesium silicate, the precipitated magnesium silicate can be obtained in a similar manner by preparing a water solution of sodium silicate and a water solution of magnesium chloride. One solution is then poured into the other and the precipitate of magnesium silicate which may also contain a small amount of sodium chloride occluded therewith is separated by filtration from the sodium chloride solution. The precipitate of magnesium silicate is then dried to the desired moisture content. As distinguished from naturally occurring magnesium and calcium silicates, such as, talc, serpentine, sepiolite, enstatite, forsterite, spadaite, wollastonite, and the like, the silicates which are used in the present invention are precipitated magnesium and calcium silicates. These precipitated magnesium and calcium silicates are white, impalpable powders and may be readily admixed with salt.

It has been found that at least about 0.5% of the precipitated magnesium or calcium silicate by weight of the salt should be used to obtain the improved results to a worthwhile degree. On the other hand, it is generally preferred to use no more than about 5% by weight of the salt. When amounts in excess of 5% are used, they may provide some significantly greater beneficial results but they are undesirable because they create a dust problem in the salt, and when such salt compositions are added to water a milky solution is formed.

While the addition of precipitated magnesium or calcium silicate alone increases the ability of the salt to resist the effects of dampening, it is generally preferred to add in combination with the precipitated magnesium or calcium silicate some quantity of an edible water-insoluble soap, such as, for example, magnesium stearate. The use of such a soap provides two benefits, namely, to reduce the tendency of the salt composition to cake, or secondly if any caking does occur, to provide for the easy disintegration of the lumps resulting from such caking. One unexpected advantage which has been discovered is that the insoluble soap when used in combination with the precipitated magnesium or calcium silicate can be used in a much greater proportion than has been possible heretofore without causing undesirable scumming when a water solution of such salt composition is prepared. The latter property is particularly advantageous in the case where the salt composition is used with water, clear solutions or clear soups because it is possible to achieve the desired salty taste without obtaining an undesirable scum on the surface of the water or soup. In the case of a precipitated magnesium silicate, it is generally preferred to use about 0.05% of the insoluble soap by weight of the salt in order to obtain the additional benefits and it is also generally preferred to use not more than 0.5% in order to avoid the problem of excessive scum formation. In the case of precipitated calcium silicate, it is generally preferred to use about .02% of the insoluble soap by weight of the salt in order to obtain additional benefits and it is also generally preferred to use not more than about .2% in order to avoid the problem of excessive scum formation.

To compare the effect of precipitated magnesium or calcium silicate when combined with table salt with that of the other generally used inhibitors such as calcium carbonate, magnesium carbonate or tricalcium phosphate, a test was devised to determine the resistance to the effects of dampening imparted to the salt by the various inhibitors or conditioners. Based on the observation of the practices of a large number of people in salting food, it was determined that an oscillation motion of about 180 per minute with a 3″ stroke having a line of motion at about 20° to the horizontal represents the general action which occurs during food salting. On the basis of this, a machine was built to provide this motion. The number of strokes of the machine necessary to completely empty a shaker filled with a given quantity of substantially pure, dry table salt having a particle size of less than 20 standard mesh was noted and this value was used as a standard in the subsequent test. It was then determined that when the amount of the salt removed from the shakers dropped to about 70% for the standard number of motions by the machine, the salt had reached a minimum of acceptable flowability. At this point the amount of moisture absorbed by the salt will also cause excessive caking. Two percent of each of calcium carbonate, tricalcium phosphate, magnesium carbonate, precipitated magnesium silicate and precipitated calcium silicate were added to substantially pure, dry table salt and a number of shakers were filled with the aforementioned standard quantity and the open shakers were allowed to stand in an atmosphere having a 90% relative humidity. At one day intervals or less a shaker with each of the salt compositions was removed, weighed to determine moisture pick-up, capped with a standard perforated cap, and tested for flowability. In this manner the number of days the salt was capable of being exposed to 90% relative humidity before its flowability was reduced to the aforementioned 70% and the amount of moisture absorbed in the process were determined. The following Table I shows the results obtained in said test:

*Table I*

| Salt Composition | Moisture absorbed | Time of exposure |
| --- | --- | --- |
|  | Percent | Days |
| NaCl+2% calcium carbonate | 0.5 | 1.3 |
| NaCl+2% tricalcium phosphate | 0.78 | 2.2 |
| NaCl+2% magnesium carbonate | 0.83 | 2.4 |
| NaCl+2% magnesol (precipitated magnesium silicate) | 2.00 | 5.7 |
| NaCl+2% silene E. F. (precipitated calcium silicate) | 2.00 | 5.7 |

From Table I it will be noted that the precipitated magnesium and calcium silicate salt compositions had a resistance to the effects of dampening, as measured by days of exposure, approximately 2½ times greater than that of the magnesium carbonate or the tricalcium phosphate and about 4 times greater than that of calcium carbonate. The importance of such greatly increased resistance to dampening for the precipitated magnesium and calcium silicate salt compositions can be fully appreciated when one considers the fact that humid atmospheric conditions generally do not prevail for any considerable, sustained period of time. For example, should the relative humidity remain at about 90% for as long as five days, the flowability of both the precipitated magnesium silicate salt composition and the precipitated calcium silicate salt composition would continue to remain above the acceptable standard of 70% while the flowability of the other inhibited salt compositions would long before have been reduced to below 70%. Further, since the relative humidity does not generally remain as high as 90% for a period of time exceeding about five days, it will be seen that the flowability of the precipitated magnesium and calcium silicate salt compositions will, under most climatic and weather conditions, always remain substantially above the accepted flowability of 70%.

When an edible water-insoluble soap is added to table salt, the resistance of such salt compositions to caking and the ease with which such caking, when formed, may be disintegrated is greatly improved. For this reason, table salts containing magnesium carbonate, calcium carbonate or tricalcium phosphate may also advantageously contain an insoluble soap, such as magnesium stearate. Generally speaking, the greater the amount of the metal stearate present the greater the resistance to caking and the greater the ease of disintegration when such caking occurs. However, as aforementioned, as the percentage of the metal stearate increases, there is a concomitant disadvantage in that the salt composition when added to water produces an objectionable scum. For this reason it has heretofore generally been considered undesirable to add large amounts of such soaps to table salt compositions.

On the other hand, when the insoluble salt is employed with a precipitated magnesium silicate it has been found that as much as about 10 times more of such soap may be added to the table salt than may be used with the common inhibitors. In the case of precipitated calcium silicate, it has been found that as much as about 2 times more of such soap may be added to the table salt than may be used with the common inhibitors. In order to compare the scum formation of insoluble soaps when added to a table salt containing fillers, such as the tricalcium phosphate and magnesium carbonate, a test was conducted to determine how much magnesium stearate could be added to table salt containing 2% of the filler. The scum was evaluated visually when ¼ teaspoon of the salt composition was placed in 150 cc. of water at 140–150° F. The test was also run on a 2% precipitated magnesium silicate salt composition and 2% precipitated calcium silicate salt composition and the following Table II presents a comparison of the results obtained wherein "Tolerance" indicates the amount of magnesium stearate which was added to the salt composition before visual scum formation was noticed:

*Table II*

| Salt composition | Tolerance, percent magnesium stearate |
|---|---|
| NaCl+2% magnesium carbonate | |
| NaCl+2% tricalcium phosphate | 0.0125 |
| NaCl+2% silene E. F. (precipitated calcium silicate) | 0.035 |
| NaCl+2% magnesol (precipitated magnesium silicate) | 0.075 |
| | 0.30 |

From Table II it is clearly seen that a much greater percentage of the water-insoluble soap can be tolerated in both the precipitated magnesium silicate salt composition and the precipitated calcium silicate salt composition without scum formation than can be tolerated in s compositions containing the other fillers.

It is apparent from the above tables that t table salt composition containing precipitat magnesium or calcium silicate is greatly superi to the salt compositions known heretofore. T resistance of a precipitated magnesium silica salt composition and a precipitated calcium sil cate salt composition to the effects of dampenir was found to be at least about 2½ times bett than the best of these inhibited salt compositior with the advantage that the present salt com positions can be exposed to high relative humidi ties for longer periods of time than has bee possible heretofore. As previously described, further important result as shown by these test is the ability of the salt compositions, when adde to water, to tolerate a much greater percentag of a metal stearate than can be tolerated with th other known inhibited salt compositions withou producing a scum formation on the surface of the solution. This results in a more improved resistance of the salt composition to caking than can be obtained with pure salt or a salt composition containing only the precipitated magnesium silicate, the precipitated calcium silicate, or the other known conditioners.

While the invention has been described in detail with specific examples, such examples are illustrative only and the invention is understood as limited only as indicated in the appended claims.

What is claimed is:

1. A table salt composition of improved flowability and non-caking qualities comprising a mixture of shaker salt, a precipitated silicate powder selected from the group consisting of precipitated magnesium silicate and precipitated calcium silicate, and an edible water-insoluble soap powder.

2. A table salt composition of improved flowability and non-caking qualities comprising salt of less than 20 standard mesh particle size, from about 0.5 to 5% precipitated magnesium silicate powder and from about .05 to 0.5% of an edible water-insoluble metal stearate powder.

3. A table salt composition of improved flowability and non-caking qualities comprising salt of less than 20 standard mesh particle size, from about 0.5 to 5% precipitated magnesium silicate powder and from about .05 to 0.5% magnesium stearate powder.

4. A table salt composition of improved flowability and non-caking qualities comprising salt of less than 20 standard mesh particle size, from about 0.5 to 5% precipitated calcium silicate powder and from about .02 to 0.2% of an edible water-insoluble metal stearate powder.

5. A table salt composition of improved flowability and non-caking qualities comprising salt of less than 20 standard mesh particle size, from about .5 to 5% precipitated calcium silicate powder and from about .02 to .2% magnesium stearate powder.

FRANK G. MILLER.

References Cited in the file of this patent
UNITED STATES PATENTS

| Number | Name | Date |
|---|---|---|
| 1,978,040 | Daitz | Oct. 23, 1934 |
| 2,234,484 | Weinig | Mar. 11, 1941 |
| 2,333,873 | Martin | Nov. 9, 1943 |
| 2,407,151 | Glogau | Sept. 3, 1946 |